A. Fuller,

Faucet.

No. 3,135. Reissued Sep. 22, 1868.

Witnesses:

C. M. Lee

E. H. Russell

Inventor:

Albert Fuller

United States Patent Office.

ALBERT FULLER, OF NEW YORK, N. Y.

*Letters Patent No.* 25,253, *dated August* 30, 1859; *reissue No.* 3,135, *dated September* 22, 1868

DIVISION B.

IMPROVEMENT IN FAUCETS.

The Schedule referred to in these Letters Patent and making part of the same.

TO ALL WHOM IT MAY CONCERN:

Be it known that the following is a full, clear, and exact description of a new and useful Improvement in Faucets, invented by me, ALBERT FULLER, formerly of Cincinnati, in the county of Hamilton, and State of Ohio, but now of the city, county, and State of New York, reference being had to the accompanying drawing, and to the letters of reference marked thereon.

This improvement relates to elastic plug-valves, as used, for instance, in faucets, that is, valves made, say, of India rubber, having a solid character or form; and my invention consists in encasing such a valve by a metallic shield, in such manner as that said shield not only answers to confine the rubber plug and keep it in proper shape all round, but also serves or may serve to form a valve of a compound character, as regards its bearing-surfaces or faces, namely, part metal and part rubber, without losing its peculiarity as an elastic plug-valve, and so that, when drawn or forced against its seat or seats that are constructed to suit such action, the rubber forms a soft central, as it were, contact with its seat, followed up by an outside bearing of metal upon metal, as the shield is brought in contact with its seat, said shield also acting, by its external position, to protect the rubber face of the valve all round, and keep it from spreading laterally, whereby a closer fit of the elastic plug against its seat is secured.

By this, my improvement, the rubber plug is so confined as that it may be kept in proper shape, when used, for instance, in hot water or steam, and the liability to leakage and binding is reduced, also the faucet made more efficient and durable.

In the accompanying drawing—

Figure 2:
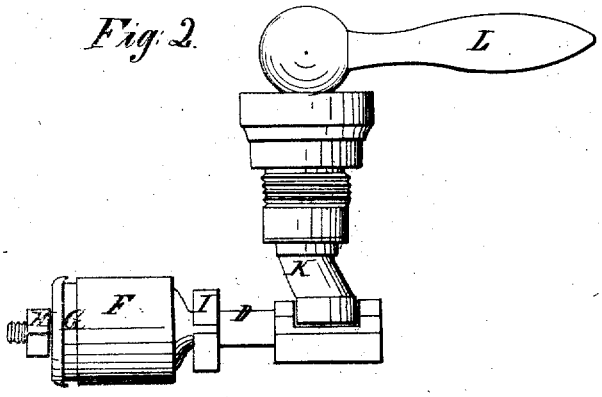
Figure 1:
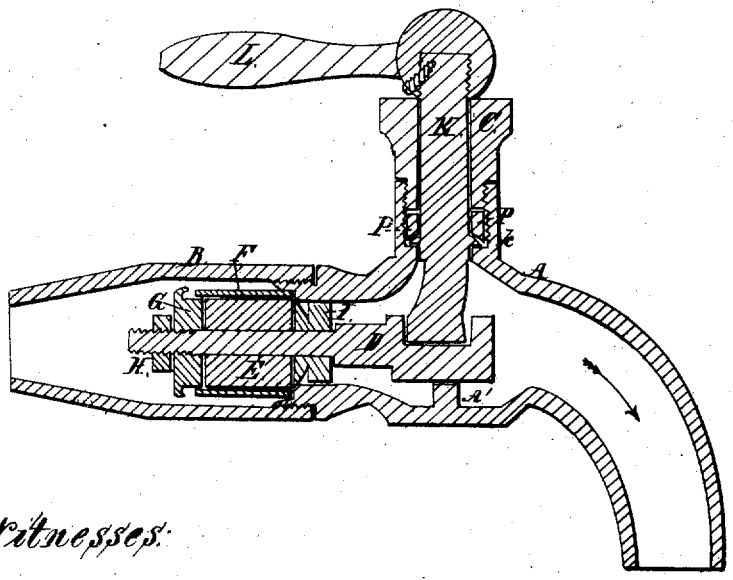

Figure 1 is a central longitudinal section of a faucet having my improvement applied to it, and Figure 2 a view of the valve and working parts detached from the body of the faucet or cock.

The body of the faucet is here shown as cast in two pieces, A and B, which are screwed together, as seen in fig. 1. The cap C is also screwed to the piece A, as shown in the same figure. By a common handle, L, the cam-shaft K is turned, giving motion to the valve-stem D, and thus opening and closing the valve. The valve is elastic, and may consist of a plug or body E, of India rubber, encased in a metallic shield, which is here shown as made in two parts, namely, a thimble, F, and head G, fig. 1, the head being movable in the thimble. By means of a screw-nut, H, the elastic body of the valve may be compressed between the head G and the disk portion of a guide, I. Thus embraced by metal, the rubber will bear a high degree of heat without undue expansion. The joint formed by the valve will be perfectly reliable, and there will be no abrasion of the rubber under the severest test.

The valve-seat may be flat, slightly angular, or of other suitable form. When the lip of the shield is intended to bear upon the valve-seat, the shape of said shield must conform to the shape of the seat. In order to prevent the lip of the shield, as the thimble or part F may be called, from being pressed too violently upon the valve-seat, the head G of the shield is made capable of sliding into the thimble F, and of again receding from the thimble as the valve leaves its seat. Although the shield may thus act in connection with the rubber to form a metal joint, in combination with a rubber joint, or a combination of a metallic valve with a rubber valve, the importance of the shield, as a protection to the elastic valve or plug E, must not be lost sight of.

The valve may be made with a shield in one piece, a spring, if desired, being placed behind it.

The cam-shaft, K, is shown with a shoulder, which rests upon a corresponding shoulder in the part or piece A of the cock, as seen in fig. 1. This supports the cam-shaft, and prevents it from resting upon the stem D Between the shoulder on the cam-shaft and lower end of the cap C, may be a stuffing-box, filled with elasti packing, P.

By this arrangement the cam-shaft K has a free movement in the cap C, and yet the water is prevented from escaping through the joints of said cap.

The cam at the lower end of the shaft K is shown embraced by a yoke in the valve-stem D, so that the turning of the handle L gives a positive motion to the valve. The length of the stem D should be such as that the cam, when its stroke is completed, will bring the valve firmly upon its seat, without violence or injury to the valve.

The construction may be somewhat varied, without departing from my invention, and gutta percha or other elastic substance may be used, instead of India rubber; therefore, I do not confine myself to the precise arrangement set forth, so long as the same object or objects is or are attained.

In my patents of 1855 and 1858, different forms of elastic plug-valves are described; therefore, I do not here broadly claim such device. In neither of these patents is the rubber plug completely or equivalently encased and confined, and therefore not so well adapted to hot fluids, nor do such valves present a metallic bearing or face outside the rubber plug, so as to protect and confine the outer bearing edges of the rubber, as is the case in this my improvement.

Having thus fully described my improvement, what I claim, and desire to secure by Letters Patent of the United States, is—

1. An elastic plug-valve, encased in the above-described metallic shield, for the purposes set forth.

2. An elastic plug-valve, encased in a metallic shield, as described, when the shield is constructed to present a valve-face, which is transversely or laterally exterior to the plug, in combination with a valve-seat or seats to both the elastic and metallic faces of the valve, substantially as shown and described.

ALBERT FULLER.

Witnesses:

A LE CLERC,

A. KINNIER.